(Model.)
S. S. HICKOK.
FRUIT GATHERER.
No. 272,690. Patented Feb. 20, 1883.
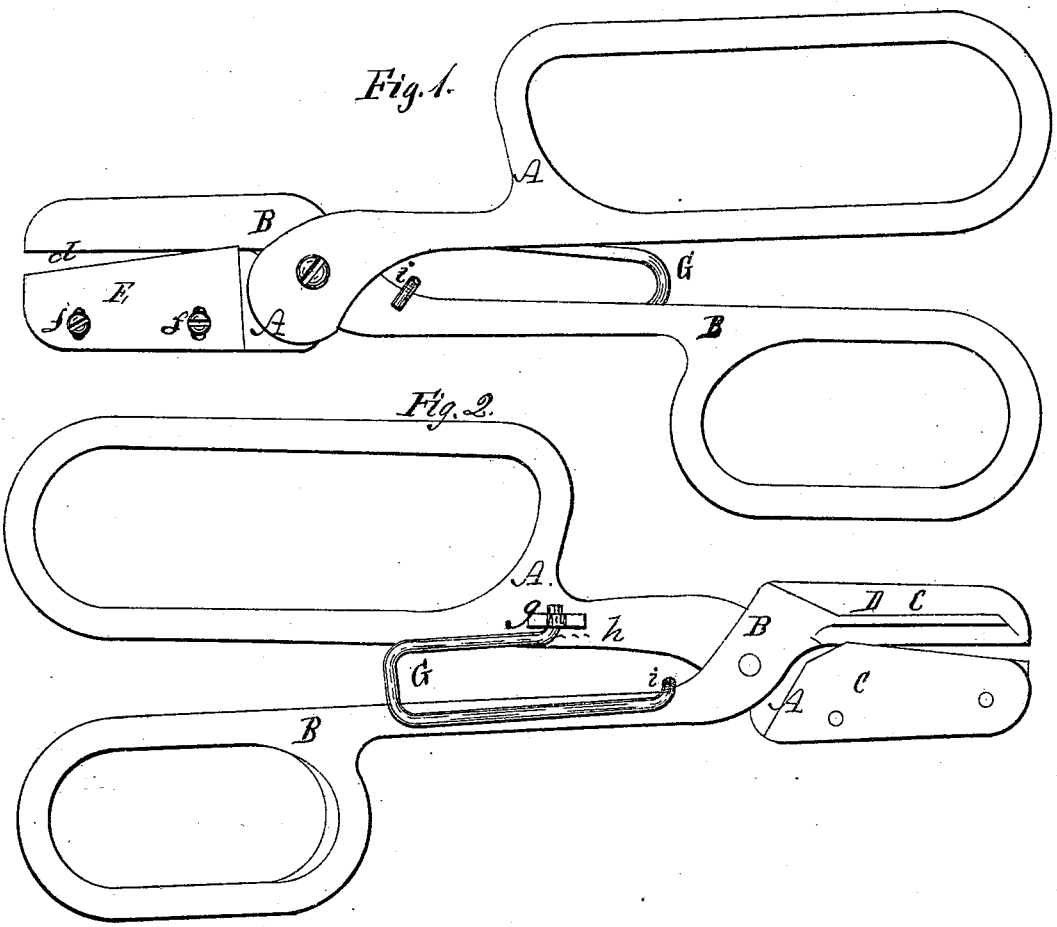
WITNESSES
INVENTOR
Samuel S. Hickok,
By his attorney,
J. S. Brown.

UNITED STATES PATENT OFFICE.

SAMUEL S. HICKOK, OF ROCHESTER, NEW HAMPSHIRE, ASSIGNOR OF ONE-HALF TO THE ATHOL MACHINE COMPANY, OF ATHOL, MASSACHUSETTS.

FRUIT-GATHERER.

SPECIFICATION forming part of Letters Patent No. 272,690, dated February 20, 1883.

Application filed August 16, 1882. (Model.)

*To all whom it may concern:*

Be it known that I, SAMUEL S. HICKOK, of Rochester, in the county of Strafford and State of New Hampshire, have invented an Improved Fruit-Gatherer; and I do hereby declare that the following is a full and exact description thereof, reference being had to the accompanying drawings, making part of this specification—

Figure 1 being a view of the upper side of my improved fruit-gatherer; Fig. 2, a view of the under side of the same; Fig. 3, an edge view of the same; Fig. 4, a front view of the jaws thereof.

Like letters designate corresponding parts in all the figures.

My improvements are upon the class of fruit-gatherers which have both a shearing or cutting-off device and means to seize and hold the fruit by the stem until it is secured, applicable also to gathering flowers. The features of my invention will be specified in order.

The body of the instrument consists of two levers or handles, A B, pivoted to and crossing each other, like shears or tongs, and these handles are as long as desired, according to the special purpose for which the instrument is intended, whether to gather apples, pears, peaches, &c., from trees, or grapes from vines nearly within reach.

The first feature of my invention consists in curving or bending the handles downward or toward a horizontal position at or near the head or upper end, as shown in Fig. 3, the curve or bend for short shears, as represented, reaching nearly the whole length of the instrument. The amount or degree of curve or bend may be about as indicated, more or less.

The object of this improvement is to bring the cutting part of the instrument into an approximately horizontal position without twisting the hand inconveniently, and to cut and hold the stems of the fruit nearly at right angles to their position, which is vertical, or approximately so, as the fruit hangs down by its own weight.

Another feature of my invention consists in the construction of the clamp-jaws C D for holding the fruit by the stem as it is cut off by the instrument. The faces *a b* of these jaws are oblique or beveled, as seen in Fig. 4, one fitting the other, so as to close parallel with it. This construction produces a wedging action in the clamping, and enables the stems to be held more securely thereby without tiring the hands. It also enables a greater movement of the shears to take place after the clamp-jaws begin to compress the stems, thus insuring a complete severing of the same after the clamping action commences. The clamp D, having the lower inclined or oblique face, *b*, has a downwardly curved or turned lip, *c*, at the lower edge of the inclination, to direct the stems otherwise inclined by the action of the beveled jaws, as above set forth, into a position nearly perpendicular to the under sides of the jaws, and by cross-indenting the stems it makes the hold thereon more secure. These clamp-jaws are cast or formed integrally with the handles A B, rendering the construction simple and cheap. One of the jaws, D, may have a cutting-edge, *d*, thereby dispensing with a separate shear-blade on that jaw. The other jaw, C, has a shear-blade, E, thereon, which is attached to the jaw, and adjustable thereon, if necessary, by screws *f f*, Fig. 1. This projecting blade has also a functional action in connection with the two oblique clamp-jaws C D, inasmuch as when the jaws are closed upon the stem it prevents any lateral yielding of the jaws, the jaw D wedging in between the jaw C and its blade E. I employ a spring, G, to hold the jaws apart, constructed and applied between the handles A B in a peculiar manner. There is a perforated lug, *g*, cast or formed on the side of one handle, A, into which one suitably-bent end, *h*, of the wire spring is inserted. The other end, *i*, of the spring is bent into a loop form and arranged to embrace the inner edge of the other handle, B. Thus the attachment is very simple and without requiring screws or any other additional means of securing it in place. The whole construction and arrangement are substantially as described and represented.

What I claim as new, and desire to secure by Letters Patent, is—

1. In a fruit-gatherer, the combination, with cutting-blades and clamping-jaws C D under the blades, each jaw having a single inclined or beveled clamping-surface, of bent handles A B and spring G, substantially as and for the purpose herein specified.

2. In a fruit-gatherer, clamp-jaws C D, one jaw, C, having a single inclined or beveled holding-face, and the other jaw, D, having an inclined or beveled face, and a lip, $b$, at the outer edge thereof, substantially as and for the purpose herein specified.

3. In combination with the handles A B, the spring G, held at one end by a lug, $g$, on one handle, and at the other end by a loop, $i$, embracing the other handle, substantially as and for the purpose herein specified.

Specification signed by me this 22d day of July, 1882.

SAMUEL S. HICKOK.

Witnesses:
HERMAN W. ROBERTS,
JAMES H. DOWNING.